United States Patent
Wipf

(12) 
(10) Patent No.: US 12,037,040 B1
(45) Date of Patent: Jul. 16, 2024

(54) VEHICLE STEERING AID SYSTEM AND DEVICE

(71) Applicant: Danny Wipf, Lake Andes, SD (US)

(72) Inventor: Danny Wipf, Lake Andes, SD (US)

( * ) Notice: Subject to any disclaimer, the term of this patent is extended or adjusted under 35 U.S.C. 154(b) by 0 days.

(21) Appl. No.: 18/121,358

(22) Filed: Mar. 14, 2023

(51) Int. Cl.
*B62D 1/06* (2006.01)
*B62D 1/04* (2006.01)

(52) U.S. Cl.
CPC .............. *B62D 1/06* (2013.01); *B62D 1/043* (2013.01)

(58) Field of Classification Search
CPC .......... B62D 1/04; B62D 1/043; B62D 1/046; B62D 1/06; B62D 1/065
See application file for complete search history.

(56) References Cited

U.S. PATENT DOCUMENTS

| | | | | | |
|---|---|---|---|---|---|
| 1,901,171 | A | * | 3/1933 | Kauffman | B62D 1/043 74/557 |
| 2,101,519 | A | * | 12/1937 | Thorp | B62D 1/043 74/557 |
| 2,123,811 | A | * | 7/1938 | Sinko | B62D 1/043 74/557 |
| 2,267,308 | A | * | 12/1941 | Russell | B62D 1/043 74/557 |
| 2,475,858 | A | * | 7/1949 | Riemann | B62D 1/043 74/557 |
| 6,701,801 | B1 | * | 3/2004 | Wilson | B62D 1/043 74/552 |
| 2001/0027699 | A1 | * | 10/2001 | Reicks | B62D 1/043 74/557 |
| 2002/0007694 | A1 | * | 1/2002 | Moc | B62D 1/043 74/557 |
| 2011/0113920 | A1 | * | 5/2011 | Lassen | B63H 25/02 403/404 |
| 2011/0179901 | A1 | * | 7/2011 | Kladde | A63H 3/36 74/557 |
| 2012/0285289 | A1 | * | 11/2012 | Walker | B62D 1/043 74/558 |
| 2014/0194800 | A1 | * | 7/2014 | Green | B25G 3/36 602/21 |
| 2014/0290413 | A1 | * | 10/2014 | Tashiro | B66F 9/24 74/484 R |
| 2018/0170276 | A1 | * | 6/2018 | Manes | B60R 11/0217 |

FOREIGN PATENT DOCUMENTS

| | | | | |
|---|---|---|---|---|
| DE | 29610635 U1 | * | 8/1996 | ............. B62D 1/043 |
| DE | 102012107334 A1 | * | 2/2014 | ............. B62D 1/043 |
| WO | WO-2008010691 A1 | * | 1/2008 | ............. B62D 1/043 |

OTHER PUBLICATIONS

Machine Translation of DE-102012107334-A1.*
Machine Translation of DE-29610635-U1.*

* cited by examiner

*Primary Examiner* — Vicky A Johnson
(74) *Attorney, Agent, or Firm* — Jeffrey A. Proehl; Woods, Fuller, Shultz & Smith, PC

(57) ABSTRACT

A system may include a steering aid device configured to be mounted on a steering wheel of a vehicle having a rim member to aid manipulation of the steering wheel. The aid device may have a hand engagement surface for being engaged by a hand of an operator of the vehicle. The hand engagement surface may have a primary section being substantially planar. The aid device may define a passage for receiving a portion of the steering wheel, and the passage may extend along a passage axis.

20 Claims, 8 Drawing Sheets

VEHICLE STEERING AID SYSTEM AND DEVICE

BACKGROUND

Field

The present disclosure relates to steering wheel attachments and more particularly pertains to a new vehicle steering aid system and device for facilitating the manipulation of the steering wheel of a vehicle by an operator of the vehicle.

SUMMARY

In some aspects, the disclosure relates to a system which may comprise a steering aid device configured to be mounted on a steering wheel of a vehicle having a rim member to aid manipulation of the steering wheel. The aid device may have a hand engagement surface for being engaged by a hand of an operator of the vehicle, and the hand engagement surface may have a primary section which is substantially planar. The aid device may define a passage for receiving a portion of the steering wheel, and the passage extends along a passage axis.

In further aspects, the disclosure relates to a system which may comprise a rotatable steering wheel of a vehicle that includes for steering the direction of movement of the vehicle and including a rim member. The system may also comprise a steering aid device mounted on the rim member of the steering wheel. The steering aid device may have a hand engagement surface for being engaged by a hand of an operator of the vehicle, and may have a primary section being substantially planar. The aid device may define a passage for receiving a portion of the steering wheel, and may extend a passage axis. The aid device may encircle a portion of the rim member of the steering wheel to retain the aid device on the steering wheel, and the hand engagement surface may lie in a plane oriented substantially parallel to the passage axis.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
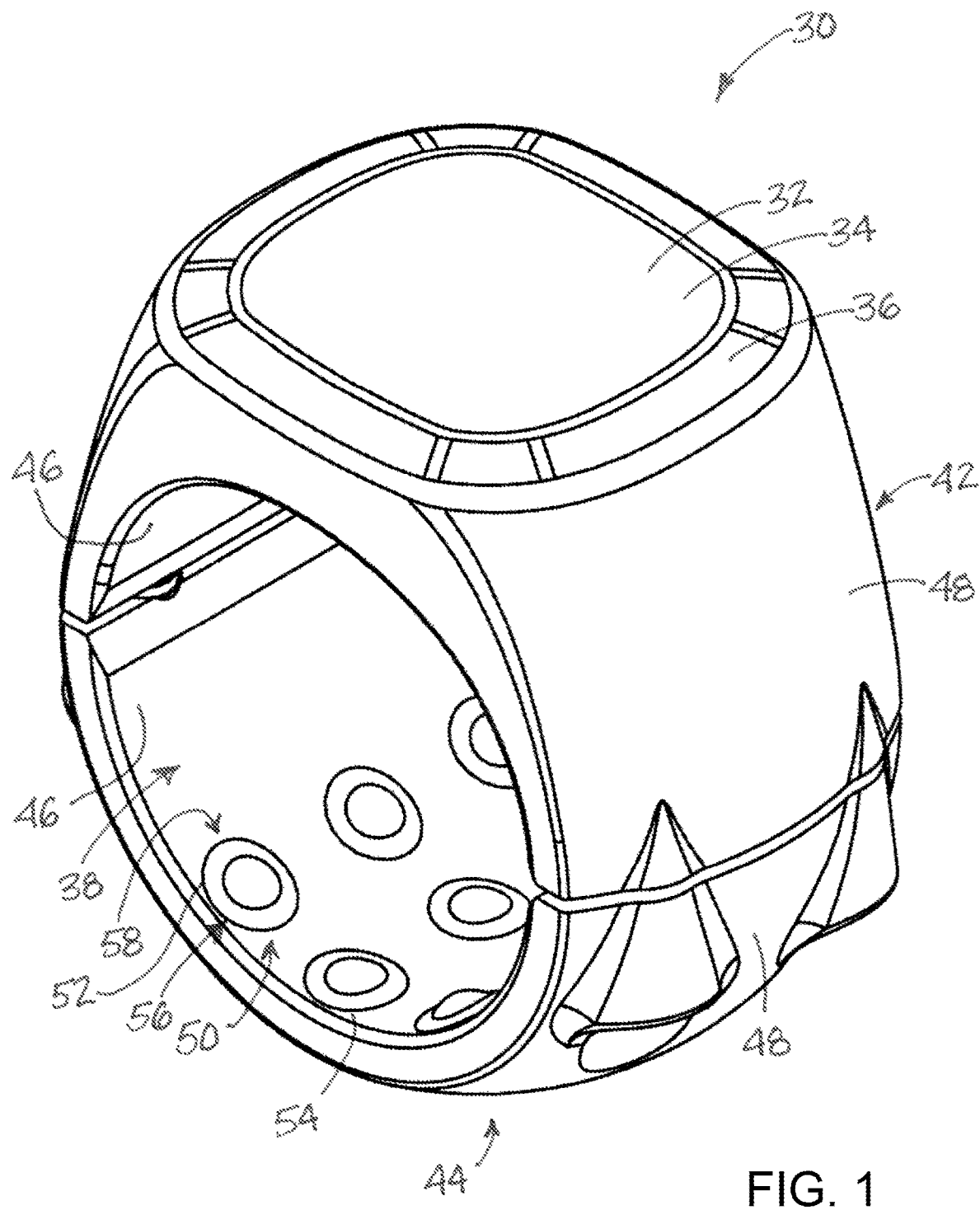
FIG. 1 is a schematic perspective view of a new vehicle steering aid device according to the present disclosure.
Figure 2:
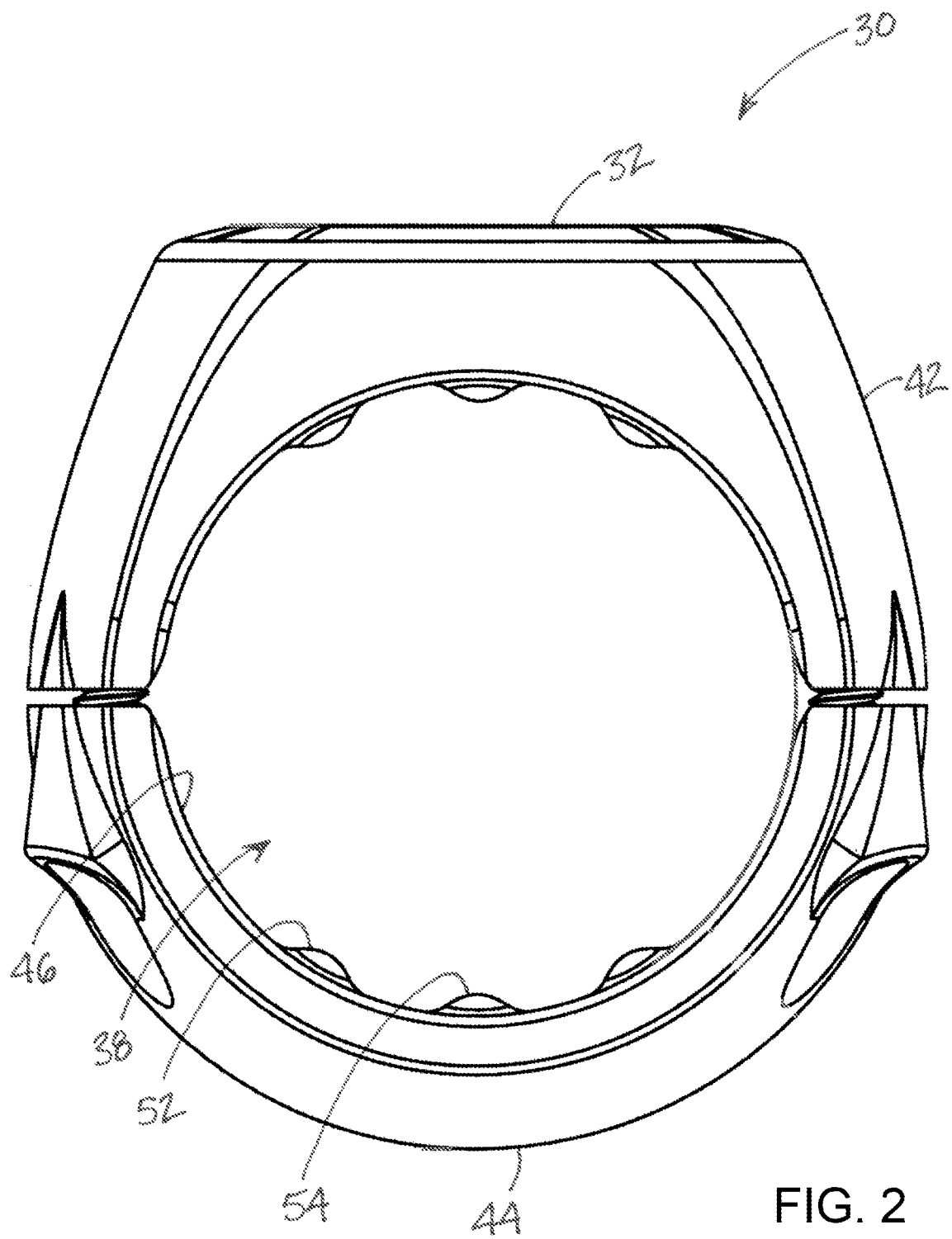
FIG. 2 is a schematic first side view of the aid device, according to an illustrative embodiment.
Figure 3:
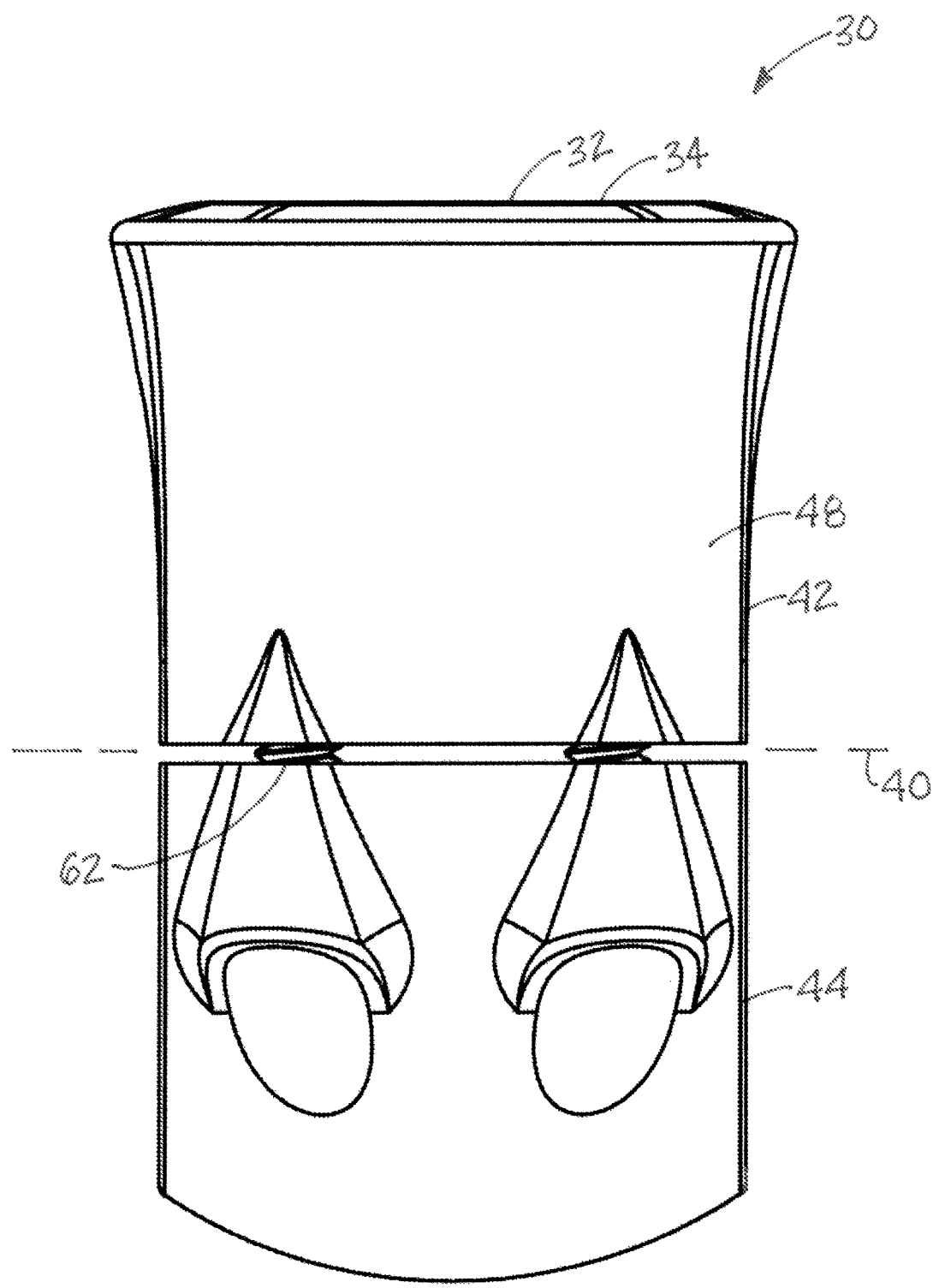
FIG. 3 is a schematic second side view of the aid device according to an illustrative embodiment.
Figure 4:
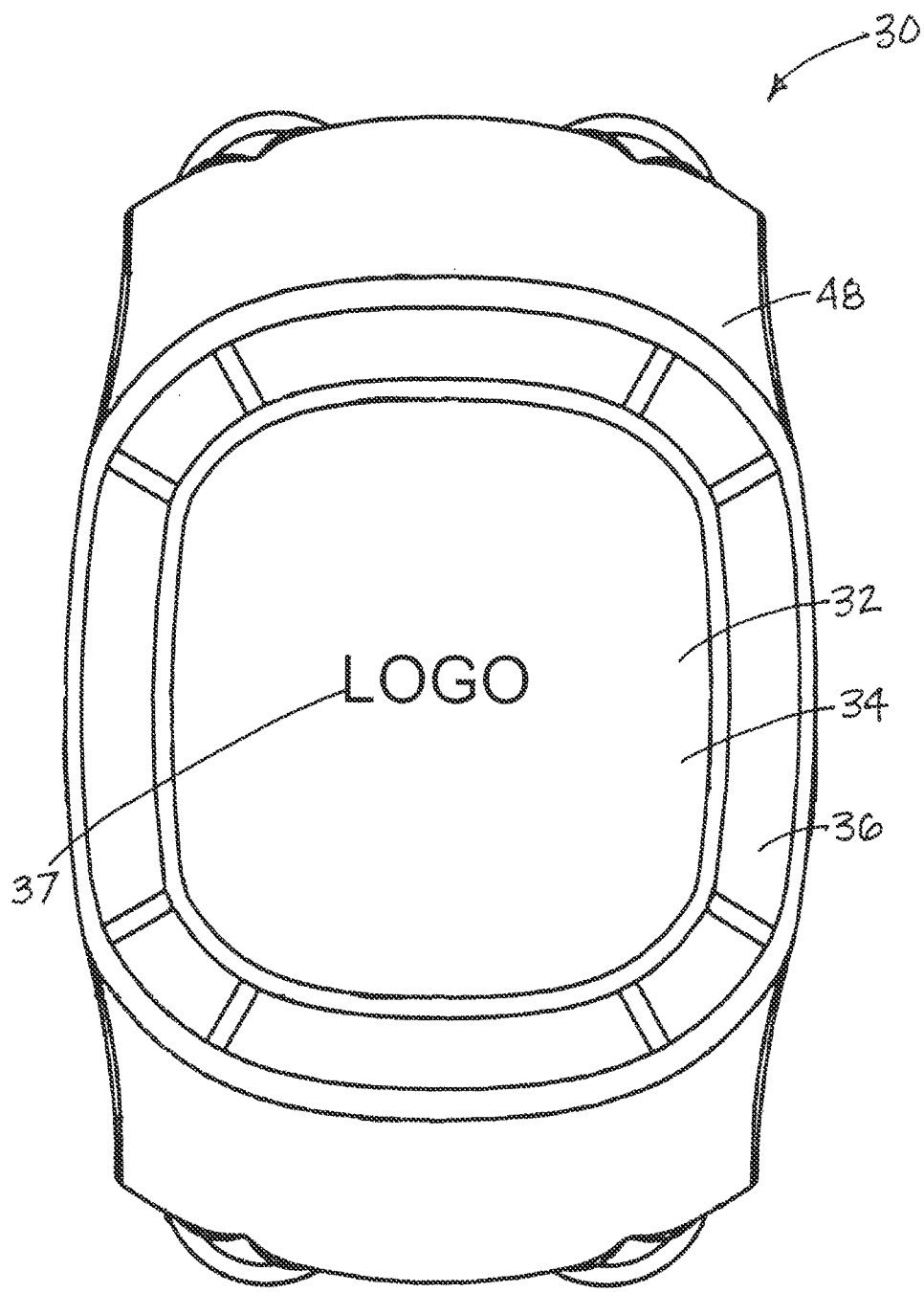
FIG. 4 is a schematic top view of the aid device, according to an illustrative embodiment.
Figure 5:
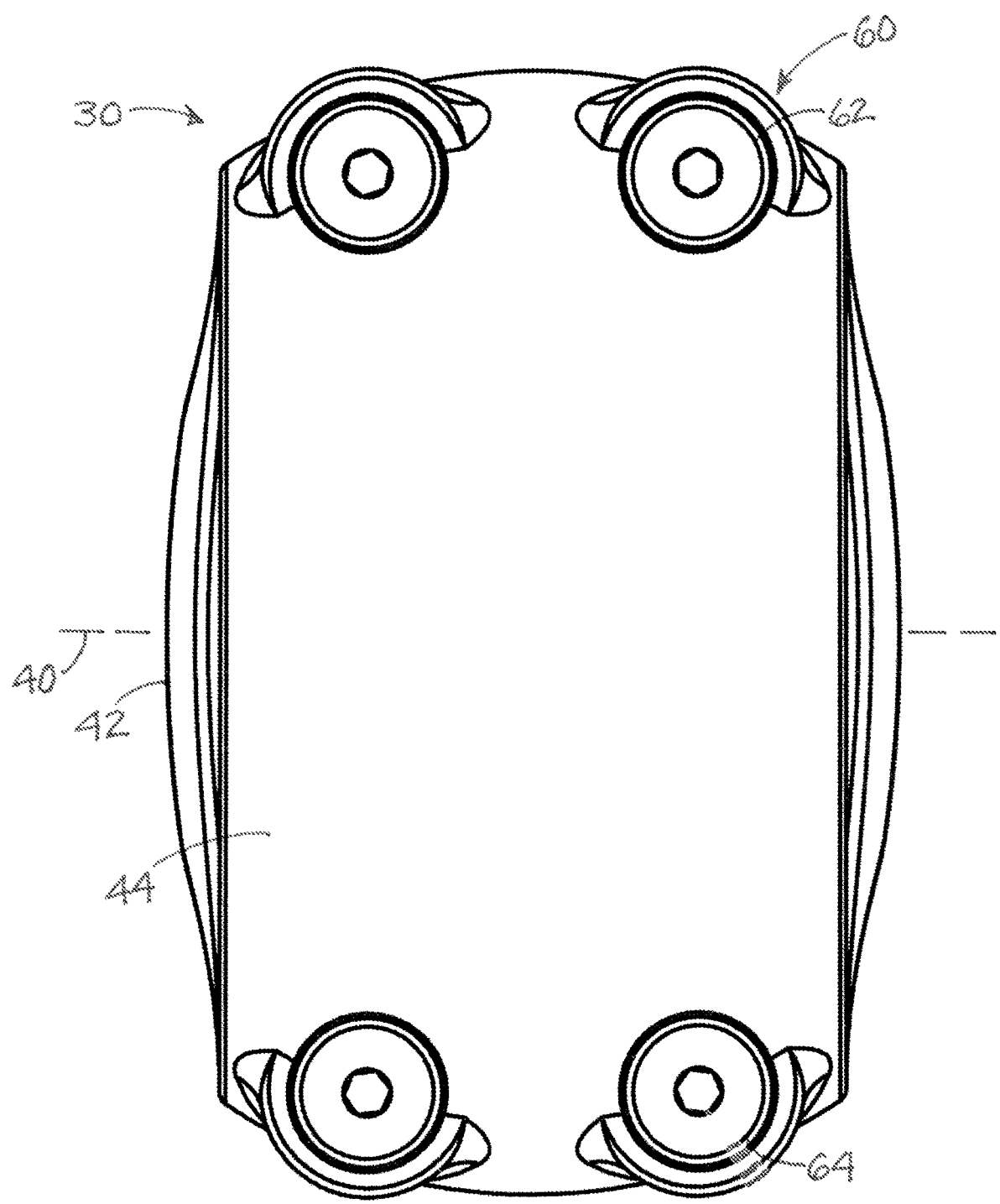
FIG. 5 is a schematic bottom view of the aid device, according to an illustrative embodiment.

With reference now to the drawings, and in particular to FIGS. 1 through 8 thereof, a new vehicle steering aid system and device embodying the principles and concepts of the disclosed subject matter will be described.

In some aspects, the disclosure relates to a system 1 which includes a steering wheel 10 of a vehicle having for steering the direction of movement of the vehicle, and typically gripped by the operator or driver of the vehicle with at least one hand, and usually two hands, to cause the wheel to rotate clockwise or counterclockwise about a rotation axis 11 to initiate right-hand or left-hand turns of the vehicle.

In greater detail, the steering wheel 10 may include a rim member 12 forming the primary element of the wheel being gripped or engaged by the hand of the operator of the vehicle when manipulating the wheel 10, and also typically defines the outer perimeter of the wheel. The rim member 12 has a rim surface 14 for being contacted by the hand of the operator, and at least a portion of the rim member may be formed of a resiliently compressible material such that at least a portion of the rim surface is resiliently compressible to enhance the comfort of the operator's hand when gripping the rim member. Typically, although not necessarily, the rim member 12 is continuous and forms a complete circle, and in some cases forms an imperfect circle with a straighten portion. The rim member 12 has a lateral cross sectional shape which may be substantially circular.

In further detail, the rim surface 14 has a front surface portion 16 which is situated to face the operator during operation of the vehicle, and the front surface portion may lie substantially in a front plane. The rim surface 14 also has a rear surface portion 18 opposite of the front surface portion. The rim surface 14 further has an outer rim surface portion 22 that extends between the front 60 and rear 18 surface portions, and may be arcuate in shape. The rim surface 14 has an inner rim surface portion 24 extending between the front and rear surfaces.

The steering wheel 10 may also include a hub member 26 which is substantially centered with respect to the rim member 12, and at least one spoke member 28 extending from the rim member to the hub member to support the rim member on the hub member. The specific number of spoke members 28 on a steering wheel may vary, and typically includes two spoke members, but commonly includes three spoke members or four spoke members.

In some aspects, the disclosure relates to a system 1 which includes a steering aid device 30 either alone or in combination with the steering wheel 10. The steering aid device 30 may aid in the manipulation of the steering wheel, and in particular may assist the operator in rotating the steering wheel without having to grip the rim member with the fingers of one or both of the operator's hands, and thus may permit the operator to rotate the steering wheel using only the inward surface of the operator's hand, such as the palm. The aid device 30 is mountable on the steering wheel to permit the steering wheel of a vehicle to be retrofit with the device 30. In embodiments, the aid device 30 encircles a portion of the steering wheel to retain the aid device on the steering wheel, and may be positionable at a variety of locations on the steering wheel. In some of the most preferred implementations, the aid device 30 may be mountable on the rim member 12 of the steering wheel. The aid device 30 may be removable from mounting on the steering wheel after mounting on the wheel. The aid device 30 may have a dismounted condition and a mounted condition with respect to the steering wheel.

The aid device 30 may have a hand engagement surface 32 for being engaged by the hand of the vehicle operator of the vehicle, such as the operator's palm. In the illustrative embodiments, the hand engagement surface 32 has a primary section 34 which is substantially planar and may define a primary plane. The primary section 34 may be located substantially central to the hand engagement surface 32. In some embodiments, the engagement surface 32 may include a secondary section 36 which extends about the primary section 34, and may surround the primary section. The secondary section 36 may extend out of the primary plane in a tapering fashion. Optionally, the indicia may be marked on the hand engagement surface 32 to provide a decorative aspect, and may include a logo 37, such as logos of sports teams, clubs, associations, businesses, etc. which may facilitate the use of the steering a device as a promotional or organizational affinity product.

The aid device 30 defines a passage 38 for receiving a portion of the steering wheel. The passage 38 may extend along a passage axis 40. In mounting the aid device 30 on a steering wheel, the portion of the steering wheel, such as the rim member, positioned in the passage 38 may be selected to suit the desires of the operator. In embodiments, the passage axis 40 may be oriented parallel to the primary plane of the hand engagement surface 32, and the device may be oriented with respect to the steering wheel such that the hand engagement surface is positioned over or adjacent to the front of the wheel 10, such as being positioned over or adjacent to front surface portion 16 of the room surface.

In greater detail, the steering aid device 30 may comprise a pair of shell components 42, 44 which are connectable together to form a circular ring for surrounding a portion of the steering wheel, such as a portion of the rim member 12. The pair of shell components may include a first shell component 42 and a second shell component 44. The first 42 and second 44 components may have an assembled condition corresponding to the mounted condition of the aid device, and a disassembled condition corresponding to the dismounted condition of the device. In illustrative embodiments, the hand engagement surface 32 is located on the first shell component 42.

At least one of the shell components may be arcuate to form the passage 38, and in the illustrative embodiments each of the first and second shell components are arcuate in shape. The first and second shell components may be arranged in an opposed orientation to each other in the assembled condition. Each of the shell components 42, 44 may have an inward surface 46 and an outward surface 48, and the surfaces 46, 48 may be opposed to each other in the assembled condition of the device 30.

In some embodiments, at least one of the shell components 42, 44 has a gripping feature 50 formed thereon for facilitating the grip of the a device 30 on the steering wheel when the device is in the mounted condition on the steering wheel. For example, the gripping feature may enhance the device's grip, or resistance to rotation with respect to, the rim member 12. The gripping feature 50 may be located on the inward surface 46 of at least one of the shell components 42, 44 for contacting one of the surface portions of the rim member of the steering wheel when the device is mounted on the wheel. In the illustrative embodiments, the gripping feature 50 is located on each of the shell components such that the gripping features on the shell components are positioned in opposition to each other in the assembled condition of the components 42, 44.

In embodiments, the gripping feature 50 may comprise at least one protrusion 52 extending inwardly from the inward surface 46 of one or both of the components 42, 44, and in the illustrative embodiments the gripping feature includes a plurality of protrusions 52, 54, and may have at least one protrusion on the inward surface of each of the shell components. Illustratively, the protrusions 52, 54 may be arranged in at least one row 56 of the protrusions, and may include a plurality of the rows 56, 58. The plurality of rows 56, 58 may include at least one longitudinal row 56 of protrusions which may be oriented in an array that extends substantially parallel to the passage axis 40, and the array of protrusions may be substantially linear. Optionally, a plurality of the longitudinal rows 56 of protrusions may be utilized, and the longitudinal rows may be oriented substantially parallel to each other. Additionally, the plurality of rows may include at least one lateral row 58 of protrusions which may be oriented in an arc extending about the passage axis 40. As a further option, a plurality of the lateral rows 58 of protrusions may be utilized, and the arcs of the plurality of lateral rows may be oriented substantially parallel to each other.

The steering a device 30 may further include connection structure 60 for connecting the pair of shell components 42, 44 together to form the assembled condition of the components, and optionally may permit the components to be disconnected from each other to produce the disassembled condition. In embodiments, one or more fasteners may be utilized to connect the shell components 42, 44 together, and illustratively the connection structure includes four fasteners. In the illustrative embodiments, the fasteners have the form of screws that extend through apertures in the second shell component 44 and into threaded holes in the first component. Other suitable types of elements and arrangements may be utilized for the connection structures.

In some embodiments, the steering a device 30 may optionally include a rotatable structure 70 mounted on one of the shell components such as the first shell component 42

Figure 6:
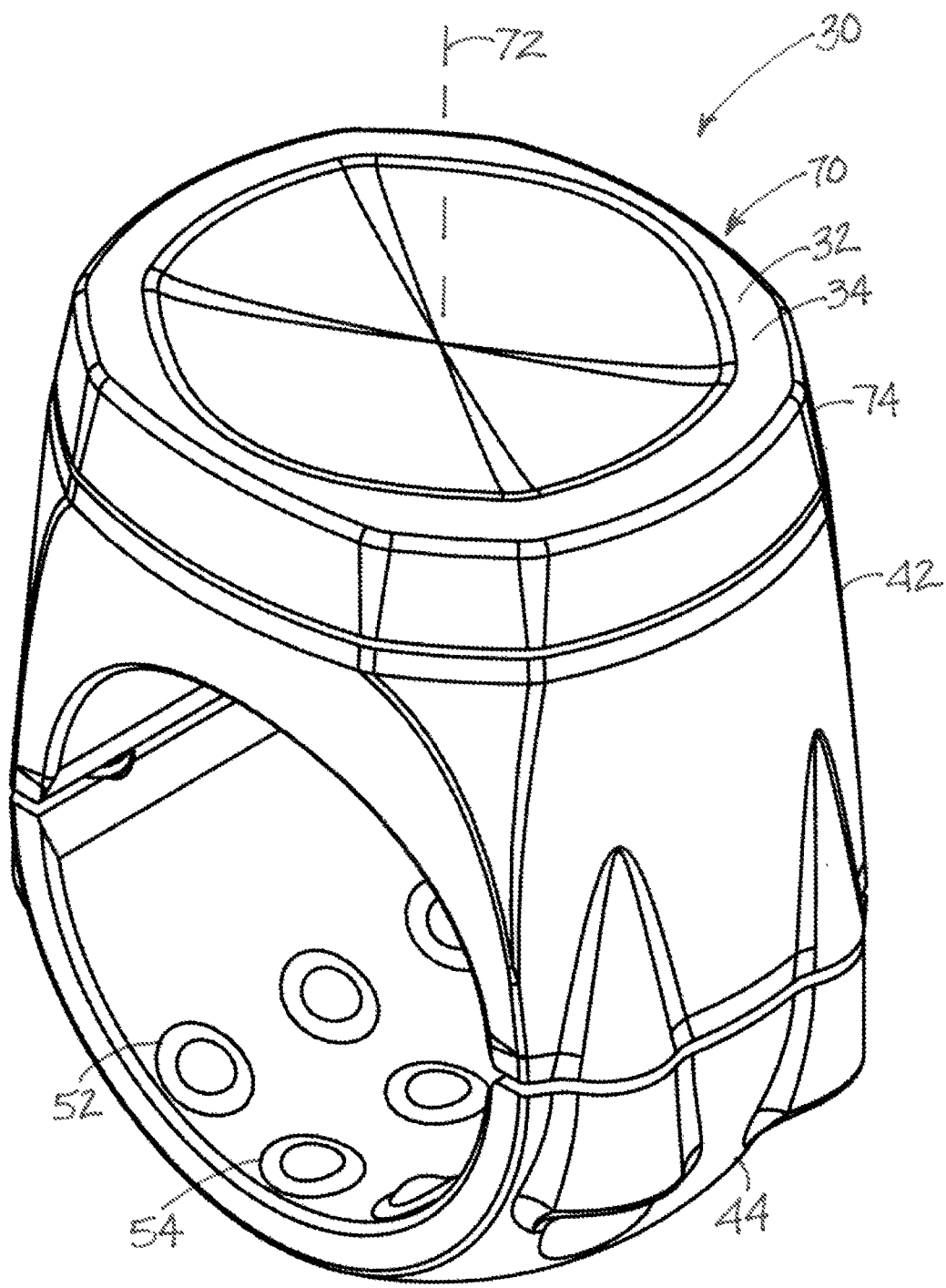
FIG. 6 is a schematic perspective view of another illustrative embodiment of the steering aid device.
Figure 7:
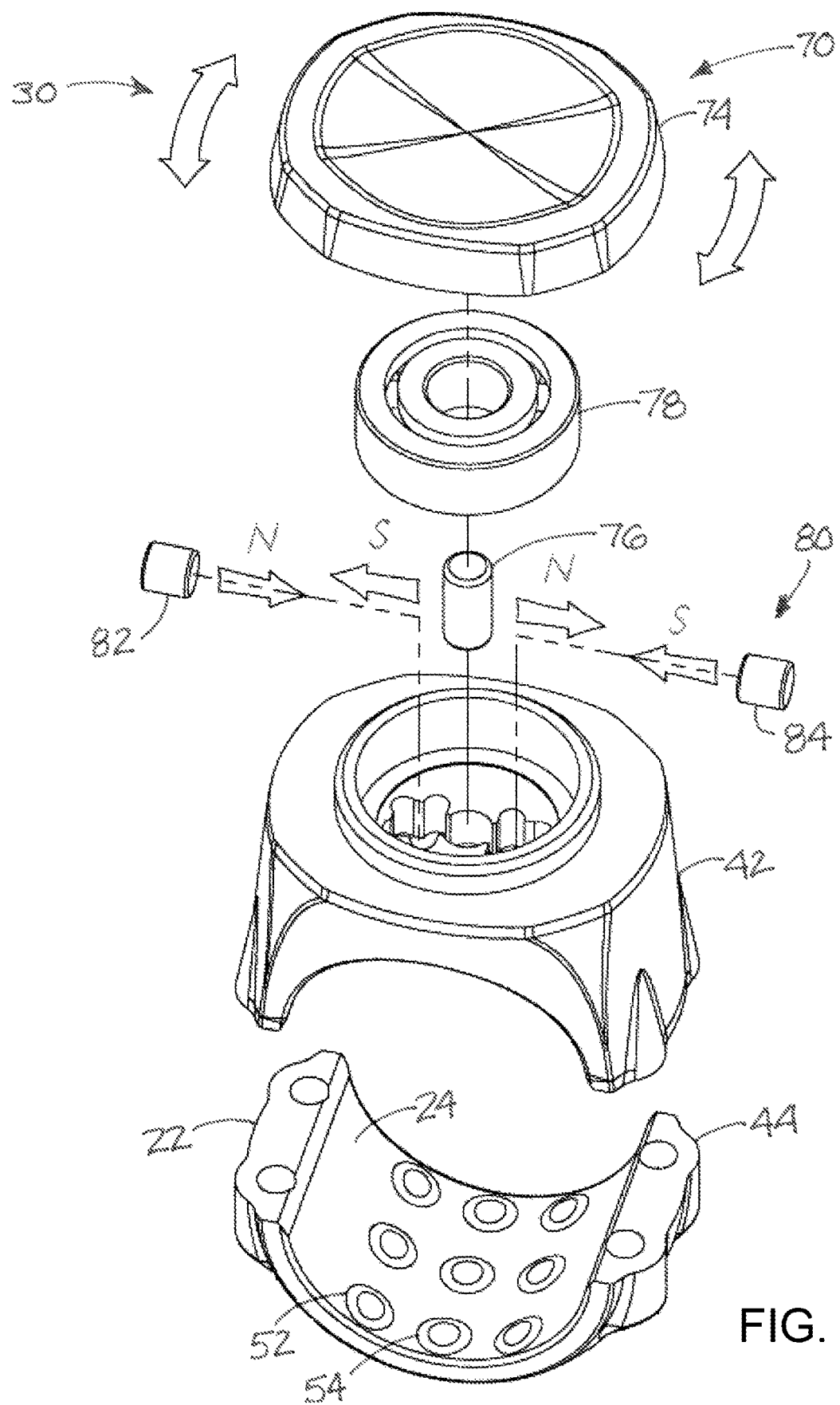
FIG. 7 is a schematic exploded perspective view of the embodiment of the aid device of FIG. 6, according to an illustrative embodiment.
Figure 8:
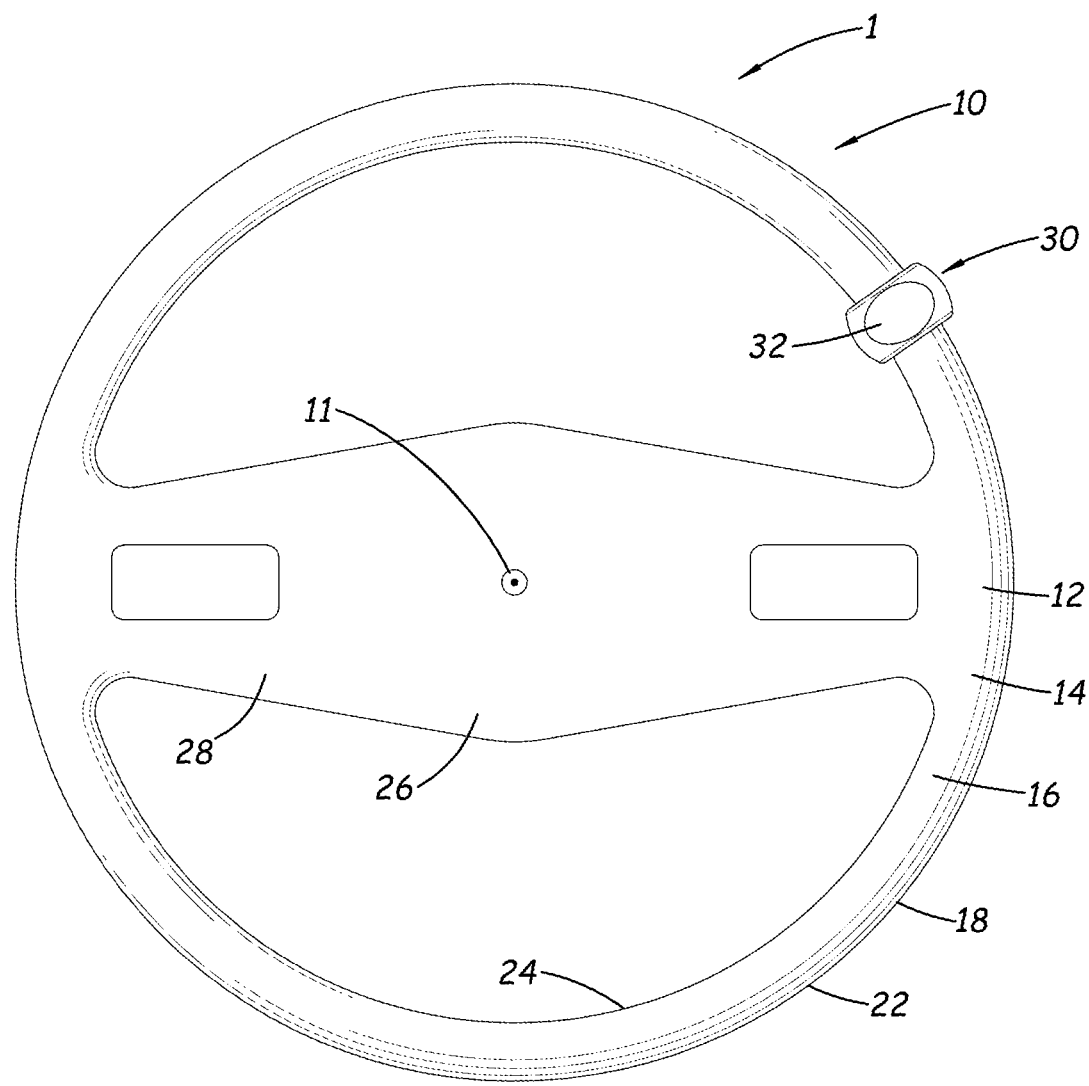
FIG. 8 is a schematic top view of a steering wheel having the steering aid device mounted thereon, according to an illustrative embodiment.

(see, e.g., FIGS. 6 and 7). The rotatable structure 70 may be rotatable with respect to the shell component. In such embodiments, the hand engagement surface 32 may be located on the rotatable structure 70 such that the engagement surface is rotatable with respect to the shell component and the steering wheel when the aid device 30 is mounted thereon. The rotatable structure 70 may be rotatable about a rotation axis 72, and the rotation axis may be oriented substantially perpendicular to the passage axis 40. In the illustrative embodiments, the rotatable structure 70 may comprise a rotation disc 74, and the rotation disc may have the hand engagement surface formed thereon. Illustratively, the rotation disc 74 may be formed by a plate. The rotatable structure may also comprise a rotation post 76, and the rotation disc 74 may be mounted on the rotation post such that the rotation disc and the rotation post rotate as a unit, although rotation of the parts independent of each other is also an option, The rotation post 76 may extend along the rotation axis 72. The rotatable structure 70 may yet further comprise a rotation bearing 78 which may be mounted on the shell component.

As a further option, some embodiments of the rotatable structure 70 may include a rotation orientation element 80 for urging the rotation disc 74 toward a specific orientation of the disc with respect to the shell component, which may be desirable when indicia is marked on the hand engagement surface and the indicia has a desired particular orientation with respect to the steering wheel. Illustratively, the specific orientation may be a rotational orientation, and the rotation orientation structure 80 may utilize magnetism to bias the rotation disc toward the specific orientation. In illustrative embodiments, the rotation orientation structure may comprise at least one orienting magnet 82 positioned adjacent to the rotation post 76, and the post may have a magnetic characteristic that tends to urge the post toward an orientation that corresponds to the specific orientation. Optionally, a pair of orienting magnets 82, 84 may be positioned adjacent to the rotation post 76, and may be positioned on opposite sides of the rotation post.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system comprising:
   a steering aid device configured to be mounted on a steering wheel of a vehicle having a rim member to aid manipulation of the steering wheel, the steering aid device having a hand engagement surface for being engaged by a hand of an operator of the vehicle;
   wherein the hand engagement surface has a primary section central to the hand engagement surface and a secondary section extending about the primary section of the hand engagement surface, the primary section being planar in a plane with a logo marked on the planar primary section; and
   wherein the aid device defines a passage for receiving a portion of the steering wheel, the passage extending along a passage axis, the passage axis being oriented parallel to the plane of the primary section of the hand engagement surface.

2. The system of claim 1 wherein the secondary section of the hand engagement surface surrounds the primary section of the hand engagement surface, the secondary section deviating from the plane of the primary section to form a bevel about the primary section.

3. The system of claim 1 wherein the steering aid device comprises a pair of shell components connected together to form a circular ring for encircling the portion of the steering wheel, the pair of shell components including a first shell component and a second shell component, the hand engagement surface being located on the first shell component.

4. The system of claim 3 wherein the first and second shell components are removably connected together such that the shell components have an assembled condition and a disassembled condition.

5. The system of claim 3 wherein each of the first and second shell components has an inward surface and an outward surface, the outward surface of the first shell component having the hand engagement surface formed thereon, the inward surfaces of the first and second shell components being opposed to each other in the assembled condition.

6. The system of claim 5 wherein at least one of the first and second shell components has a gripping feature formed thereon, the gripping feature being located on the inward surface of the at least one shell component for contacting a surface of the portion of the steering wheel when the steering aid device is mounted on the steering wheel.

7. The system of claim 6 wherein the gripping feature comprises at least one protrusion extending inwardly from the inward surface of the at least one shell component.

8. The system of claim 6 wherein the gripping feature includes a plurality of protrusions located on each of the shell components such that the protrusions of the shell components are positioned in opposition to each other in an assembled condition of the first and second shell components.

9. The system of claim 6 wherein the gripping feature includes a plurality of protrusions arranged in at least one row.

10. The system of claim 9 wherein the at least one row comprises a longitudinal row of protrusions oriented in an array extending substantially parallel to the passage axis.

11. The system of claim 10 wherein the gripping feature includes a plurality of protrusions arranged in a plurality of the rows additionally including a lateral row of protrusions oriented in an array extending substantially perpendicular to the passage axis.

12. The system of claim 9 wherein the at least one row comprises a lateral row of protrusions oriented in an array extending substantially perpendicular to the passage axis.

13. The system of claim 3 wherein the steering aid device additionally comprises a connection structure configured to releasably connect the pair of shell components together.

14. The system of claim 3 wherein the steering aid device additionally comprises a rotatable structure mounted on the first shell component and being rotatable with respect to the first shell component, the hand engagement surface being located on the rotatable structure such that the hand engagement surface is rotatable with respect to the first shell component and the steering wheel when the steering aid device is mounted thereon.

15. The system of claim 14 wherein the rotatable structure is rotatable about a rotation axis oriented substantially perpendicular to the passage axis.

16. The system of claim 14 wherein the rotatable structure comprises a rotation disc having the hand engagement surface thereon and a rotation orientation element for urging the rotation disc toward a specific orientation of the rotation disc with respect to the shell component.

17. The system of claim 16 wherein the rotation orientation element of the rotatable structure utilizes magnetism to bias the rotation disc toward the specific orientation.

18. A system comprising:
   a steering wheel of a vehicle including for steering the direction of movement of the vehicle, the steering wheel being rotatable, the steering wheel comprising a rim member; and
   a steering aid device mounted on the rim member of the steering wheel, the steering aid device having a hand engagement surface for being engaged by a hand of an operator of the vehicle;
   wherein the hand engagement surface has a primary section central to the hand engagement surface and a secondary section extending about the primary section of the hand engagement surface, the primary section being planar in a plane with a logo marked on the planar primary section;
   wherein the aid device defines a passage for receiving a portion of the steering wheel, the passage extending along a passage axis, the passage axis being oriented parallel to the plane of the primary section of the hand engagement surface; and
   wherein the aid device encircles a portion of the rim member of the steering wheel to retain the aid device on the steering wheel.

19. The system of claim 18 wherein the steering aid device comprises a pair of shell components connected together to form a circular ring encircling the portion of the rim member of the steering wheel, the pair of shell components including a first shell component and a second shell component, the hand engagement surface being located on the first shell component.

20. A system comprising:
   a steering aid device configured to be mounted on a steering wheel of a vehicle having a rim member to aid manipulation of the steering wheel, the steering aid device having a hand engagement surface for being engaged by a hand of an operator of the vehicle;
   wherein the hand engagement surface has a primary section central to the hand engagement surface and a secondary section extending about the primary section of the hand engagement surface, the primary section being planar in a plane with a logo marked on the planar primary section;
   wherein the aid device defines a passage for receiving a portion of the steering wheel, the passage extending along a passage axis, the passage axis being oriented parallel to the plane of the primary section of the hand engagement surface; and
   wherein the steering aid device has a secondary axis, the secondary axis of the steering aid device being oriented perpendicular to the plane of the primary section of the hand engagement surface, the secondary axis being oriented perpendicular to the passage axis of the passage, the first shell component having a width which tapers narrower toward the hand engagement surface, the width of the first shell component tapering wider away from the hand engagement surface and toward the second shell component.

* * * * *